(12) United States Patent
Gebauer

(10) Patent No.: US 8,690,451 B2
(45) Date of Patent: Apr. 8, 2014

(54) CAGE FOR A ROLLING BEARING, COMPRISING GUIDING MEANS

(75) Inventor: Rainer Gebauer, Bamberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 58 days.

(21) Appl. No.: 13/254,717

(22) PCT Filed: Mar. 19, 2010

(86) PCT No.: PCT/EP2010/053629
§ 371 (c)(1),
(2), (4) Date: Sep. 2, 2011

(87) PCT Pub. No.: WO2010/106172
PCT Pub. Date: Sep. 23, 2010

(65) Prior Publication Data
US 2012/0002911 A1    Jan. 5, 2012

(30) Foreign Application Priority Data
Mar. 20, 2009 (DE) .......................... 10 2009 014 276

(51) Int. Cl.
*F16C 33/46*        (2006.01)
(52) U.S. Cl.
USPC ........................................................ 384/572
(58) Field of Classification Search
USPC ................... 384/572, 576, 578, 579, 623, 470
See application file for complete search history.

(56) References Cited

U.S. PATENT DOCUMENTS

| | | | |
|---|---|---|---|
| 2,946,633 A | | 7/1960 | Gothberg |
| 3,785,710 A | * | 1/1974 | Alling ........................... 384/623 |
| 4,413,866 A | * | 11/1983 | Geisey ........................... 384/572 |
| 5,116,146 A | * | 5/1992 | Stenert ........................... 384/578 |
| 5,249,872 A | * | 10/1993 | Rhodes et al. .................. 384/574 |
| 2010/0111460 A1 | * | 5/2010 | Albrecht et al. ............... 384/572 |
| 2011/0081105 A1 | * | 4/2011 | Nakamura et al. ............. 384/470 |

FOREIGN PATENT DOCUMENTS

| | | |
|---|---|---|
| DE | 39 02 937 A1 | 8/1990 |
| DE | 42 32 433 A1 | 3/1994 |
| DE | 10 2006 022 951 A1 | 11/2007 |
| DE | 10 2007 009 811 A1 | 9/2008 |
| EP | 0 457 020 A1 | 11/1991 |

OTHER PUBLICATIONS

Translation of DE 3902937, obtained Aug. 28, 2013.*

* cited by examiner

*Primary Examiner* — Alan B Waits
*Assistant Examiner* — Brian McGovern
(74) *Attorney, Agent, or Firm* — Lucas & Mercanti, LLP

(57) ABSTRACT

A cage for a rolling bearing which has pocket-shaped recesses for receiving rolling bodies and at least one guiding means for guiding the cage. The at least one guiding means is detachably connected to the cage. Thus, by design, the structure designed for the guiding of the cage is simple, economical and flexible, and suitable for all kinds of different cage shapes and dimensions.

7 Claims, 3 Drawing Sheets

CAGE FOR A ROLLING BEARING, COMPRISING GUIDING MEANS

CROSS-REFERENCE TO RELATED APPLICATIONS

This application is a 371 of PCT/EP2010/053629 filed Mar. 19, 2010, which in turn claims the priority of DE 10 2009 014 276.2 filed Mar. 20, 2009. The priority of both applications is hereby claimed and both applications are incorporated by reference herein.

FIELD OF THE INVENTION

The present invention relates to a cage for a rolling bearing, which has pocket-shaped recesses for receiving rolling bodies and at least one guide means which assists in guiding the cage.

BACKGROUND OF THE INVENTION

The guidance of a cage in an assembled rolling bearing is generally necessary in order that, during operation, said cage, in its functional position, is precisely and reliably positioned relative to the raceways of the rolling bearing or relative to parts of the adjoining structure, for example a shaft or a housing. In this way, precise positioning of the rolling bodies and therefore correct functioning of the rolling bearing are ensured. One or even more guide means may be provided depending on the application and the design of the rolling bearing or the cage thereof. Rolling bearings equipped with cages without corresponding guide means have a tendency to wear more quickly and to generate more intense running noise, and moreover require a cumbersome cage guide in the adjoining structure surrounding the rolling bearing.

DE 10 2006 022 951 A1 describes a cage segment for a cage of a rolling bearing. Said cage, in the region of the pocket-shaped recesses, has tongue-like guide means for receiving rolling bodies, which tongue-like guide means are integrally connected to the cage segment. The guide means serve inter alia as support elements in order to support the cage relative to the raceway of an outer ring, for example in the event of a temperature-induced expansion.

A disadvantage of said cage of a rolling bearing is however that the provision of guide means on said cage makes the production of said cage more difficult and makes said cage cumbersome and expensive. Furthermore, flexibility with regard to the design of the guide means is restricted because, for example with regard to the selection of the material, one is already restricted to the material of the cage basic body.

OBJECT OF THE INVENTION

The invention is therefore based on the object of providing a cage of the generic type which is cheap to produce and which is improved with regard to the design of its guidance characteristics.

SUMMARY OF THE INVENTION

The invention therefore proceeds from a cage for a rolling bearing having pocket-shaped recesses for receiving rolling bodies and having guide means which serve for guiding the cage. Here, it is provided, according to the invention, that at least one guide means is detachably connected to the cage.

A simple, cheap and flexible design for the guidance of the cage is therefore provided, wherein a wide variety of cage forms and cage dimensions can be realized. As a result of the fact that the guide means is detachable, the cage and the guide means can be produced separately from one another, which makes the production both of the cage and also of the guide means easier, and reduces costs. Moreover, the material of the guide means may be adapted to specific applications, and may be selected independently of the material of the cage.

It is provided in a first advantageous refinement that the guide means is clipped or latched to the cage. In this way, the guide means can be connected in a particularly simple manner to the cage during the production thereof.

A further very advantageous refinement of a cage designed according to the invention provides that, between at least two pocket-shaped recesses of the cage, at least one further recess is provided which serves for receiving the guide means which can be clipped in This contributes to reliable retention of the guide means on the cage.

It is expedient for a plurality of further recesses for receiving guide means to be arranged so as to be distributed uniformly about the circumference of the cage, wherein in each case one pocket-shaped recess and one such further recess are arranged in an alternating fashion. In this way, the guidance of the cage about its entire circumference can be optimized, wherein the design of the individual guide means need be less complex than would be the case if only one guide means were provided.

Here, with regard to the guidance characteristics, good producibility and assemblability, it has proven to be advantageous for the guide means to have a body with an approximately rectangular, elongate outline shape, the body of the guide means being provided with in each case at least one latching formation on its side walls.

It may advantageously be provided that the body is provided with a recess. This may either contribute to a desired weight saving or the recess may also serve to receive further functional elements.

In a very expedient embodiment of the invention, it may for example be provided that, within the said recess, there is arranged at least one flexible component which, during its positioning, has an oversize with respect to the pitch circle diameter of the rolling bodies. By means of said measures, it is possible to meet particular demands with regard to the damping and the rotational resistance of a rolling bearing equipped with the cage according to the invention. The oversize has the effect that, when the rolling bearing is installed, a pressure is exerted on at least one of the raceways thereof, and this is associated with an increase in friction torque.

Targeted adjustment of the rotational resistance or of the damping properties by means of the cage designed according to the invention may be realized through the selection of corresponding materials. It is however also possible for such an adjustment to be realized by means of at least one spring element integrated into the flexible component.

To improve the positioning and positional fixing of the guide means on the cage, it may expediently be provided that the body of the guide means is provided with a groove which serves to at least partially receive a part of the cage. Here, the groove may advantageously be of approximately arc-shaped or hook-shaped design in plan view.

In particular for the guidance of the cage on a shaft (adjoining structure), it is advantageous for the body of the guide means to be provided with at least one guide surface which is arranged radially at the inside, and aligned approximately parallel to the axial direction, when the guide means is in the assembled position on the cage.

BRIEF DESCRIPTION OF THE DRAWING

A preferred embodiment of the cage designed according to the invention for a rolling bearing will be explained in more detail below with reference to the appended drawings, in which.

DETAILED DESCRIPTION OF THE DRAWING

Figure 1:
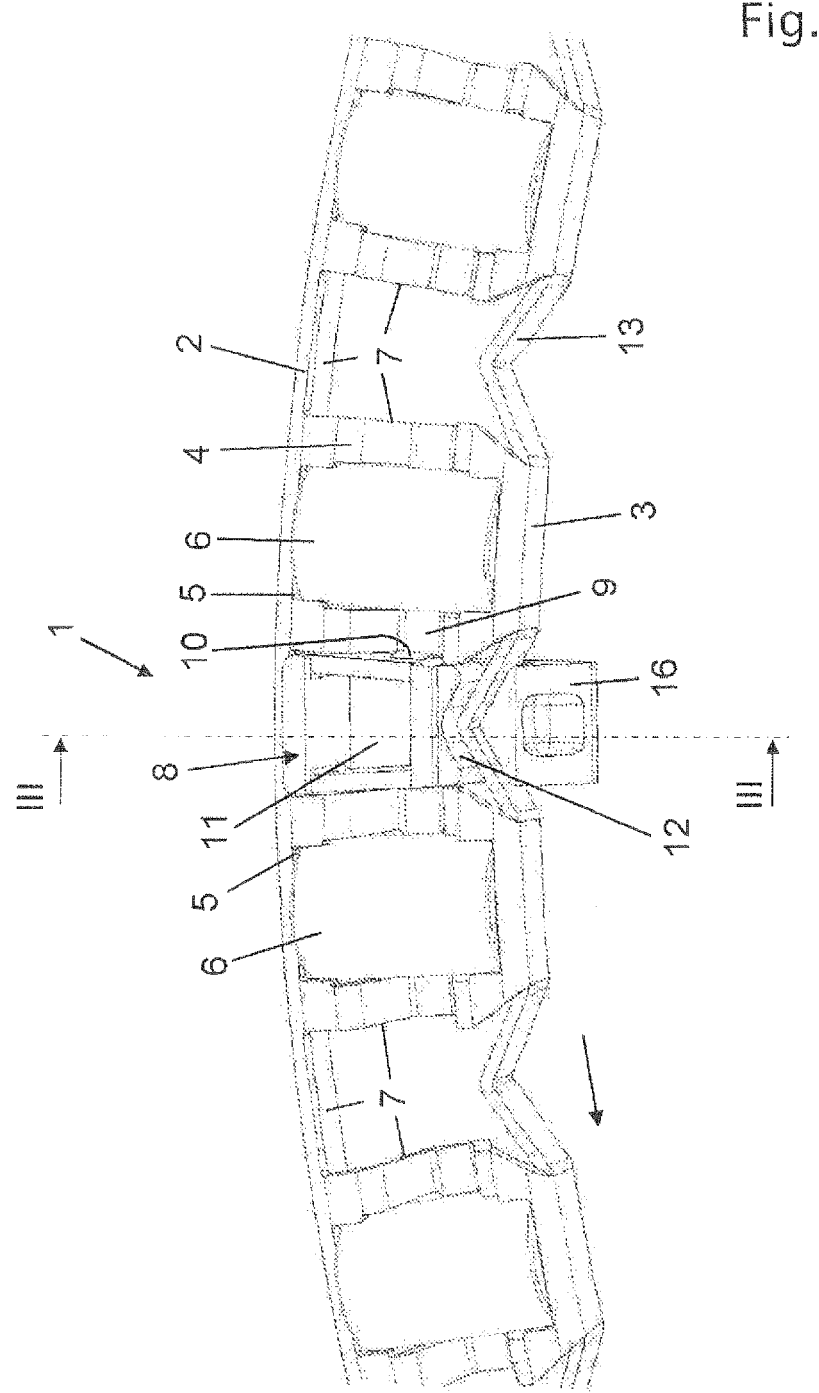
FIG. 1 shows a perspective view of a bearing cage according to the invention with an inserted guide means, wherein only a part of the cage is illustrated.

Reference is made firstly to FIG. 1. Said figure shows an axial partial view of a bearing cage 1 according to the invention which has an outer ring 2 and an inner ring 3. The outer ring 2 and inner ring 3 are connected to one another by means of webs 4, wherein the webs 4 are arranged so as to be spaced apart uniformly about the circumference of the bearing cage 1. In this way, firstly pocket-like recesses 5 for receiving roller-shaped rolling bodies 6 and secondly further recesses 7 for receiving guide means 8 are formed. The pocket-like recesses 5 and the further recesses 7 are arranged, so as to be distributed over the circumference, in an alternating fashion. In the exemplary embodiment shown, however, only one recess 7 is fitted with a guide means 8.

As viewed in the circumferential direction corresponding to the arrow, the webs 4 are in approximately the shape of a depression with a plurality of stepped portions and a lowest, bottom portion 9.

The guide means 8 shown is pushed into a recess 7 in the upward direction from the underside of the bearing cage 1 and is latched or clipped against the portion 9 by means of two latching elements 10, only one of which is shown. It is clear that the outline shape of the guide means 8 is approximately matched to the shape of the recess 7, and is approximately rectangular.

It can also be seen that the guide means 8 has a recess 11 approximately in the region between the two rings 2, 3 of the bearing cage 1. Said recess 11 may for example serve to receive a flexible component, which will be discussed in greater detail in conjunction with FIG. 3.

In the region of the inner ring 3 of the bearing cage 1, the guide means 8 is provided with a groove 12 which serves to receive a part 13 of the inner ring 3. Said part 13 is of hook-shaped or roof-shaped design in plan view in the exemplary embodiment shown. The part 3 may self-evidently take other possible forms, for example an arcuate form. The illustrated form increases the purchase of the guide means 8 on the bearing cage 1 both in the circumferential direction and also in the radial direction.

Figure 2:
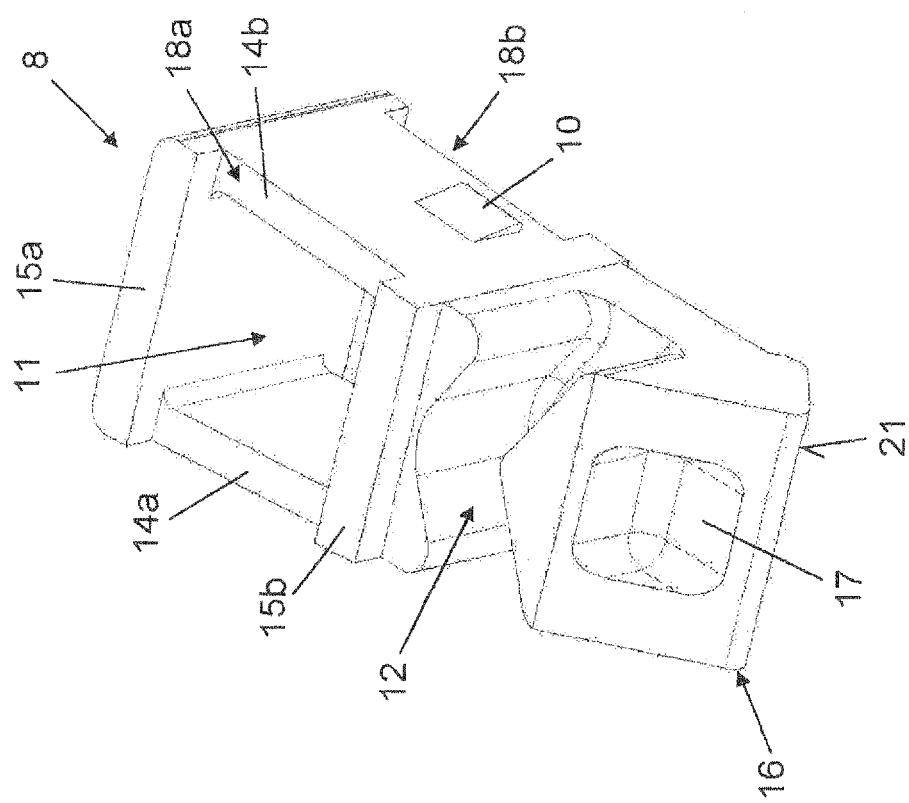
FIG. 2 shows a perspective illustration of a guide means.

Reference will now be made to FIG. 2, which illustrates the guide means 8 on its own in a perspective, greatly enlarged view. It is possible to clearly see the recess 11 which is delimited by two side walls 14a, 14b and two end walls 15a, 15b. The already-mentioned latching element 10 is situated in each case on the outer surfaces of the side walls 14a, 14b, wherein here, too, only one latching element is visible on account of the selected view.

Proceeding radially inwardly from the radially inner end wall 15b, it is possible to see the groove 12 into which the part 13 of the inner ring 3 of the bearing cage 1 engages when the guide means 8 is in the assembled position. Furthermore, the groove 12 serves to form a radially inner end piece 16 which is provided with a depression 17 which points radially inward when the guide means 8 is in the assembled position. Furthermore, the end piece 16 has a guide surface 21, the function of which will be explained further below. The two side walls 14a and 14b have in each case a smaller height than the two end walls 15a and 15b, as a result of which approximately rectangular recesses 18 are formed on the guide means 8.

Figure 3:
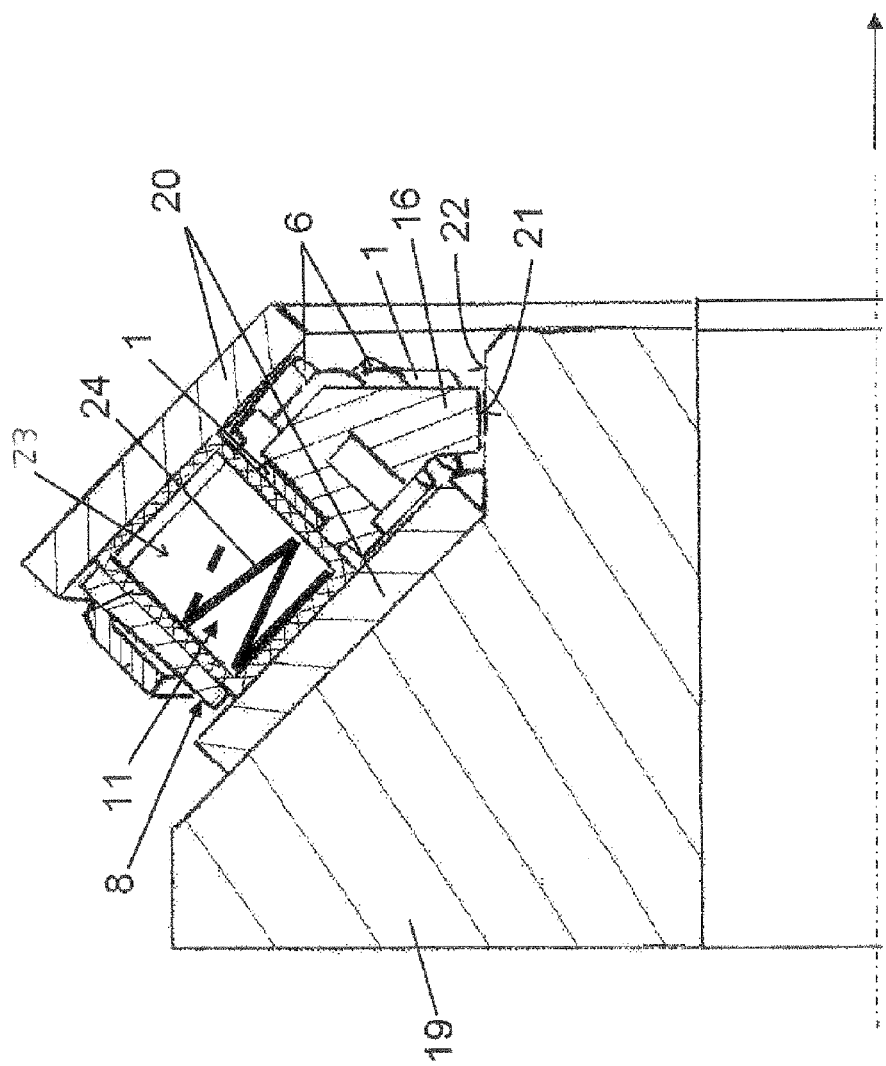
FIG. 3 shows a longitudinal section through the bearing cage, mounted on an adjoining structure, as per the sectional view III in FIG. 1, wherein the adjoining structure is not shown in FIG. 1.

FIG. 3 shows a sectional illustration as per the sectional view III-III in FIG. 1, wherein FIG. 3 additionally illustrates an adjoining structure with a shaft 19 arranged radially at the inside and also with bearing rings 20. It can also be seen that, in the illustrated assembled position of the bearing cage 1 according to the invention, the radially inner end piece 16 bears, so as to provide guidance, with the radially aligned guide surface 21 against a radial external shoulder 22 of the shaft 19. Here, the guide surface 21 is aligned approximately parallel to an axial direction A of the bearing cage.

Also illustrated is a flexible component 23 which is sunk into the above-mentioned recess 11 of the guide means 8 and which has an oversize with respect to the pitch circle diameter of the rolling bodies 6. As a result, in the assembled state, the flexible component 23 presses against the two bearing rings 20, which leads to an increase in friction torque and damping. Said effect may be adjusted through the selection of different suitable materials. It is however also possible for this to be realized through the use of an additional spring element 24 which is arranged within the flexible component 23 and which is merely indicated. The flexible component 23 may also be a felt impregnated with lubricant.

The guide means 8 may self-evidently also be produced in different ways. Said guide means 8 may for example be a plastic injection-molded part or a laminated fabric part produced in a cutting process, or may also be produced as a sheet-metal shaped part.

LIST OF REFERENCE SYMBOLS

1 Bearing Cage
2 Outer Ring
3 Inner Ring
4 Webs
5 Pocket-like Recesses
6 Rolling Bodies
7 Further Recesses
8 Guide Means
9 Lowest, Bottom Portion of the Webs
10 Latching Element
11 Recess
12 Groove
13 Part of the Inner Ring 3
14a Side Wall of the Guide Means
14b Side Wall of the Guide Means
15a End Wall of the Guide Means
15b End Wall of the Guide Means
16 Radially Inner End Piece
17 Depression
18a Recesses
18b Recesses
19 Shaft
20 Bearing Rings
21 Guide Surface
22 Radial External Shoulder of the Shaft 19
23 Flexible Component
24 Spring Element
A Axial Direction of the Bearing Cage

The invention claimed is:

1. A cage for a rolling bearing, comprising:
   pocket-shaped recesses for receiving rolling bodies;
   at least one further recess arranged between two of the pocket-shaped recesses; and
   at least one guide means, which assists in guiding the cage, detachably connected to the cage in the at least one further recess, whereby the rolling bodies are received only in the pocket-shaped recesses and the at least one guide means is received only in the at least one further recess,
   wherein the guide means has a body with a substantially rectangular, elongate outline shape and the body has sidewalls, at least one latching element on the sidewalls, and a recess, and
   wherein at least one flexible component is arranged in the recess of the body, which flexible component is oversized with respect to a pitch circle diameter of the rolling bodies.

2. The cage as claimed in claim 1, wherein the guide means is clipped to the cage.

3. The cage as claimed in claim 1, wherein the at least one further recess includes a plurality of further recesses distributed uniformly about a circumference of the cage such that the pocket-shaped recesses and the further recesses are arranged in an alternating fashion.

4. The cage as claimed in claim 1, further comprising at least one spring element integrated into the flexible component.

5. The cage as claimed in claim 1, wherein the body has a groove which serves to at least partially receive a part of the cage.

6. The cage as claimed in claim 5, wherein the groove is arc-shaped or hook-shaped as viewed in plan view.

7. The cage as claimed in claim 1, wherein the body has at least one guide surface which is arranged radially at an inside of the cage, and aligned substantially parallel to an axial direction of the cage, when the guide means is in an assembled position on the cage.

* * * * *